United States Patent [19]

Dareing

[11] 4,225,270
[45] Sep. 30, 1980

[54] METHOD AND APPARATUS FOR CONNECTING A FLOWLINE TO AN OFFSHORE INSTALLATION

[75] Inventor: Donald W. Dareing, Houston, Tex.

[73] Assignee: Maurer Engineering Inc., Houston, Tex.

[21] Appl. No.: 908,580

[22] Filed: May 22, 1978

[51] Int. Cl.² ............... F16L 1/00; B63B 35/04; E21B 43/01
[52] U.S. Cl. .................... 405/168; 166/346; 405/158
[58] Field of Search ............ 405/168, 158, 169, 170, 405/173, 156; 166/344, 345, 346, 347

[56] References Cited

U.S. PATENT DOCUMENTS

| | | | |
|---|---|---|---|
| 3,378,066 | 4/1968 | Otteman et al. | 166/346 |
| 3,434,296 | 3/1969 | Otteman et al. | 405/169 |
| 3,531,941 | 10/1970 | Vincent | 405/168 |
| 3,670,513 | 6/1972 | Matthews, Jr. | 405/169 |
| 3,775,986 | 12/1973 | Daughtry | 405/169 |
| 3,893,305 | 7/1975 | Walker | 405/168 |
| 3,978,677 | 9/1976 | Lochridge | 405/166 |

Primary Examiner—Dennis L. Taylor
Attorney, Agent, or Firm—Neal J. Mosely

[57] ABSTRACT

A method and apparatus are disclosed for connecting a flowline having a major portion adapted to lie along the floor of a body of water to an offshore connection point. The method and apparatus are designed to compensate for the difficulty encountered in laying and maintaining an underwater flowline in a body of water having a substantial current running in substantially a single direction. The flowline is fed from a flowing support and drawn by a cable into an alignment funnel. Means are provided to bow the leading flowline in a lateral non-vertical direction by a predetermined amount such that the end of the leading flowline may enter the alignment funnel without any lateral or angular displacement. The bowing may be done at the surface prior to submersion of the flowline or may be done after the flowline is submerged. Several means for bowing the flowline are disclosed.

14 Claims, 14 Drawing Figures

METHOD AND APPARATUS FOR CONNECTING A FLOWLINE TO AN OFFSHORE INSTALLATION

BACKGROUND OF THE INVENTION

1. Field of the Invention

This invention relates to underwater flowlines for offshore production of oil or gas or the like and more particularly to a method and apparatus for connecting an underwater flowlines to an underwater connection point in water having a substantial current running in substantially a single direction.

2. Brief Description of the Prior Art

A development of offshore oil and gas wells frequently necessitates the use of offshore installations for drilling and subsequently for producing from the completed subsea well. These installations are fixed or floating platforms which are positioned over the well head. It is usually necessary to provide one or more flowlines from the well head or other underwater connection point to the shore or to the platform above or to another platform or subsea well. The flowlines may serve many purposes, the most being to carry off the output of oil or gas from a well. The underwater connection point is often a multiple conduit manifold or connector which is commonly called a "Christmas Tree". The flowlines are generally lowered from a floating support which is often referred to as a lay barge. The flowline is unreeled from the barge or other floating support and lowered to the floor of the ocean. The end of the flowline is connected to a cable and pulled into an alignment funnel where it is connected to the underwater connection point.

When a flowline is being connected to an underwater connection point in water having a substantial current, the flowline drifts substantially away from the connection point and the current forces the flowline itself away. As a result, the flowline is pulled into the connection funnel at an angle by the cable and must undergo a relatively sharp bend which creates stresses in the flowline leading to early failure.

In the laying and connecting of underwater flowlines it is well known to provide buoys or controlled ballasting for controlling the amount of flexing of the flowline in a vertical direction, as in Lochridge U.S. Pat. No. 3,978,677. Sorenson U.S. Pat. No. 3,589,136 discloses an elongated underwater conduit support member for supporting the conduit and controlling its curvature in a vertical direction during the laying of a flowline. Neal U.S. Pat. No. 3,650,114 discloses an apparatus and method for maintaining a controlled curvature of an underwater flowline in a vertical direction to provide for the transition from the connection of the flowline to an underwater connection point to a vertically extended portion which becomes a production riser. None of these patents, however, are concerned with the problem of reducing or eliminating stresses in the lateral non-vertical direction in the flowlines which result from the movement of the flowline or the vessel from which the flowline is fed by water currents.

SUMMARY OF THE INVENTION

It is one object of this invention to provide an improved method and apparatus for connecting underwater flowlines in a body of water having a substantial current to an underwater connection point.

Another object of this invention is to provide an improved method and apparatus for connecting underwater flowlines in a body of water having a substantial current to an underwater connection point having an alignment funnel wherein stresses in the flowline are eliminated at the point of introduction of flowline to the alignment funnel.

A futher object of this invention is to provide a method and apparatus for connecting an underwater flowline to an underwater connection point in a body of water having a substantial current wherein the flowline is bent to provide a straight portion for introduction into an alignment funnel at the connection point.

Other objects of this invention will become apparent from time to time throughout the specification and claims as hereinafter related.

This invention consists broadly of a method and apparatus for connecting an underwater flowline in a body of water having a substantial current to an underwater connection point having an alignment funnel. The flowline is fed from a floating position and drawn by a cable into said alignment funnel. The flowline is bowed in a lateral non-vertical direction by a predetermined amount such that the end of the leading flowline may enter said alignment funnel without any lateral or angular displacement.

DESCRIPTION OF THE PREFERRED EMBODIMENTS

Figure 1:
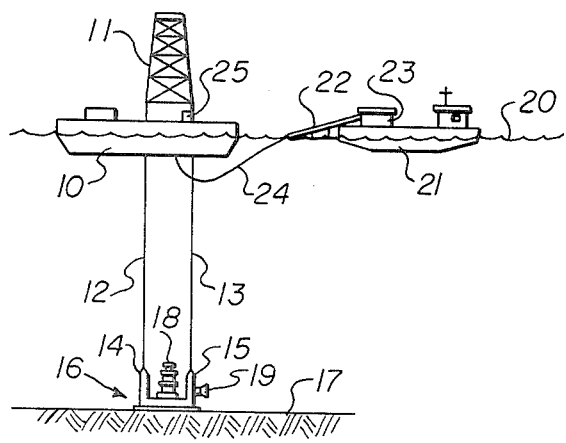
FIG. 1 is a somewhat schematic vertical view of an offshore installation showing the connection of a flowline from a reel barge to the flowline pulling device.
Figure 2:
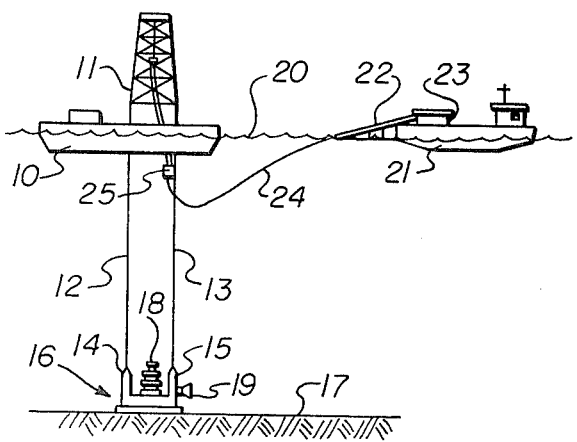
FIG. 2 is a somewhat schematic view, similar to FIG. 1, showing the reel barge moved away and the cable starting to pull the flowline.
Figure 3:
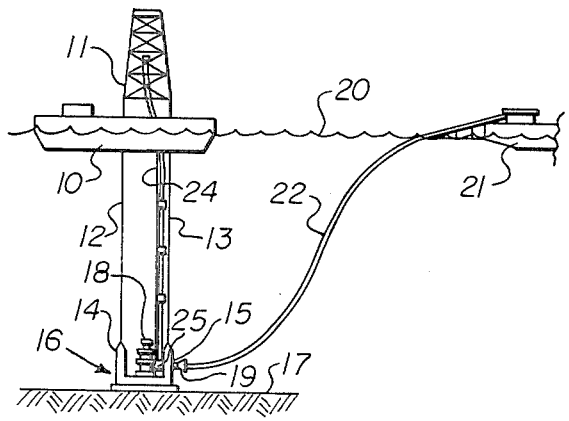
FIG. 3 is a somewhat schematic view similar to FIGS. 1 and 2 showing the flowline pulled into position at the entrance to the alignment funnel.

Referring now to the drawings, FIGS. 1 to 3 show an offshore drilling installation which is shown in the form of a floating platform 10 having a derrick 11 and anchored by cables 12 and 13 to vertical supports 14 and 15 on a well head 16 located on the ocean floor 17. There is a connection point 18 which is shown schematically as an underwater "Christmas Tree" connection. The apparatus is provided with an alignment funnel 19 positioned for introduction of the underwater flowline to a point where it can be connected to the underwater connection point.

On the surface 20 of the water there is a reel barge 21 or other floating support for an underwater flowline 22 which is to be connected to connection point 18. The flowline 22 is supplied from a reel 23 and may consist of a single continuous length of flowline or a series of separate lengths connected end to end. Whenever the term leading flowline is used, it is intended to mean the leading length of flowline in the case of a series of segments in a segmented flowline or the leading end portion of a continuous flowline. Flowline 22 is connected by cable 24 to running tool 25 which is used to cause the cable 24 to pull flowline 22 into position.

In FIG. 2 the reel barge 21 has been moved some distance away from floating platform 10 and running tool 25 is partially lowered toward the well head. The running tool 25 is lowered furthered and fixed into position at the well head as shown in FIG. 3. Cable 25 is pulled upward around the running tool and draws the flowline 24 toward the alignment funnel 19.

Figure 4:
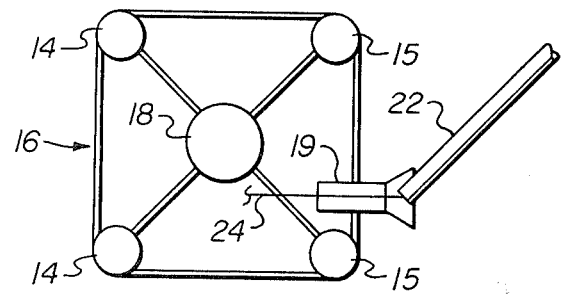
FIG. 4 is a plan view at the bottom of the body of water showing the cable about to pull the flowline into the alignment funnel from a substantial angle of drift.
Figure 5:
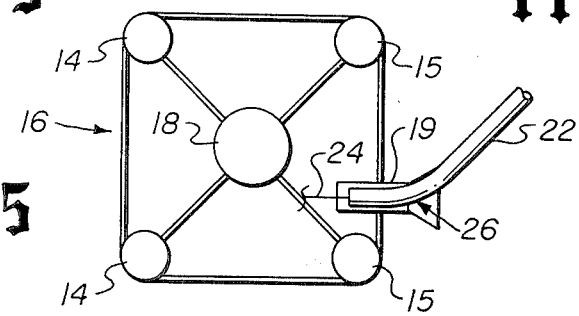
FIG. 5 is another plan view similar to FIG. 4 showing the flowline pulled into the alignment funnel from a substantial angle of drift.

When a flowline is being connected in calm water there is no particular problem with the arrangement thus far described. When a flowline is being installed in water in which there is a substantial current running in substantially the same direction transverse to the alignment funnel the reel barge 21 will be moved laterally in relation to the sub-sea well head and the flowline itself will be moved by the force current to a substantial angle relative to the alignment funnel. This situation is illustrated in FIG. 4 in which there is shown a partial plan view of the ocean at the well head. In FIG. 4, the well head 16 and upright supports 14 and 15, "Christmas Tree" or other connection point 18 and alignment funnel 19 are shown, still somewhat schematically, slightly enlarged in relation to FIGS. 1 to 3. A portion of flowline 22 which constitutes the leading flowline is shown at a substantial angle relative to the alignment funnel 19. Cable 24 is shown in a position starting to pull the end of leading flowline 22 into alignment funnel 19. In FIG. 5, the end portion of flowline 22 has been pulled into alignment funnel 19 by cable 24 and is sharply bent as indicated at 26. This sharp bending of flowline 22 makes it difficult to pull the flowline into the alignment funnel 19 and produces very high stresses in the flowline which result in early fatigue failure of the flowline.

Figure 6:
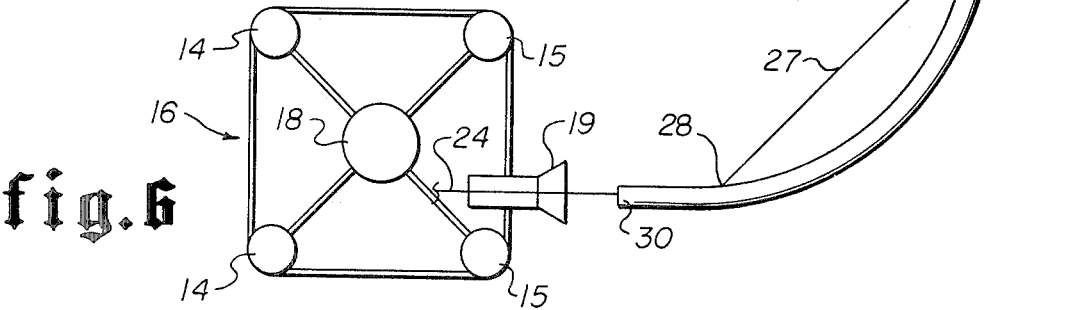
FIG. 6 is another plan view showing the flowline bowed to permit its introduction into the alignment funnel from a substantial angle of drift without angular or lateral displacement in the alignment funnel.

FIG. 6 illustrates schematically the method of this invention in which the leading flowline 22 is bowed at the end portion thereof over a substantial length, preferably about 200 ft. The bowing may be accomplished by a cable 27 connected at point 28 on flowline 22 at some substantial distance back from the end of the flowline and connected at point 29 on flowline 22 at the rear end of the section to be bowed. The tightening of cable 27 causes flowline 22 to be bowed in a very long shallow arc, as illustrated. The end portion 30 of flowline 22 which is connected to cable 24 remains straight and may be pulled straight into alignment funnel 19 without any angular or lateral displacement. The bowing of flowline 22 by cable 27 is lateral to the flowline and does not cause any vertical bending of the flowline. This bowing of flowline 22 allows the flexing of the flowline to take place over a long shallow curvature as shown in FIG. 6 rather than a short sharp curvature as seen in FIG. 5. The bowing of the flowline can be accomplished by any of a variety of mechanical means. The flowline may be bowed on the surface before it is submerged in the water. In that case the flowline must be bowed by a calculated amount to compensate for the angle of offset produced by the water current. Alternatively, the flowline may be submerged and bowed as it is brought toward the alignment funnel. In this case, some controllable means must be provided for effecting the bowing of the flowline so it can be bowed a predetermined amount such that the end portion remains straight and is aligned with alignment funnel 19. In FIGS. 7 to 14 of the drawings, several means are illustrated for bowing flowline 22 in a lateral non-vertical direction to permit entrance of the end 30 of flowline 22 straight into alignment funnel 19 with no lateral or angular displacement.

Figure 7:
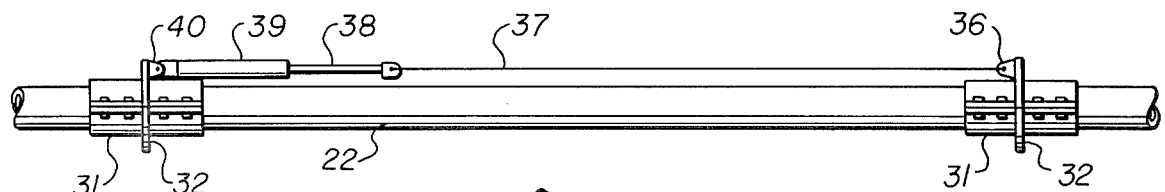
FIG. 7 is a view of one embodiment of an apparatus installed on the leading flowline to cause the flowline to bow to the position shown in FIG. 6.
Figure 8:
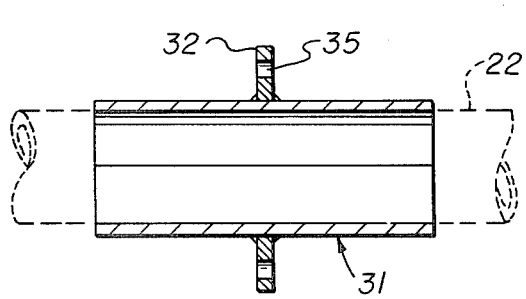
FIG. 8 is a detailed view partially in section of one of the sleeves used in the apparatus shown in FIG. 7.
Figure 9:
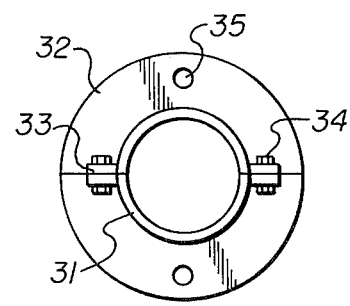
FIG. 9 is an end view of the sleeve shown in FIG. 8.
Figure 10:
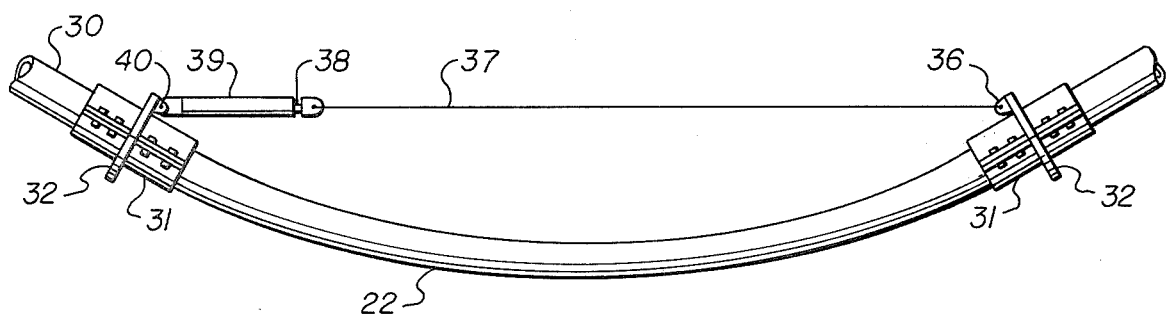
FIG. 10 is a view of the apparatus shown in FIG. 7 actuated to a position bowing the flowline to the amount shown in FIG. 6.

In FIG. 7, there is shown a detail view of one means for effecting the desired bowing of flowline 22. Flowline 22 is provided with a pair of sleeves 31 which are shown in more detail in FIGS. 8 and 9. Sleeve 31 is split longitudinally into two segments and fits around flowline 22 as shown in FIG. 8. The mid portion of sleeve 31 is provided with an angular flange 32 having radially extending flange portions 33 which are secured together by bolts 34 clamping flange 32 and sleeve 31 in place. Each of flanges 32 is provided with holes 35 for receiving eyebolt 36 or the like. A cable 37 is connected at one end to connector 36 and at the other end to piston 38 of fluid (pneumatic or hydraulic) actuated cylinder 39 which is connected as at 40 to flange 32. Fluid actuated cylinder 39 is actuated in the reverse direction by application of pressure. Application of pressure to cylinder 39 causes piston 38 to move to the left to tighten cable 37. In FIG. 10, cylinder 39 and piston 38 have been actuated to tighten cable 37 to the position shown. In this position, flowline 22 is bowed over a long shallow curvature, as indicated, with end portion 30 remaining straight for introduction into alignment funnel 19. This apparatus for bowing flowline 22 may be actuated on the surface to produce the desired degree of bowing of flowline 22 before it is submerged in the water. Alternatively, the flowline may be submerged in the water in the position shown in FIG. 7 and fluid actuated cylinder 39 and piston 38 actuated to bow flowline 22 to the desired predetermined amount to permit introduction of the end portion 30 into alignment funnel 19 with no angular or lateral displacement. One advantage in carrying out the bowing of flowline 22 under water is that the amount of bowing may be finely adjusted to produce the precise amount of bowing required to introduce end portion 30 straight into alignment funnel 19.

Figure 11:
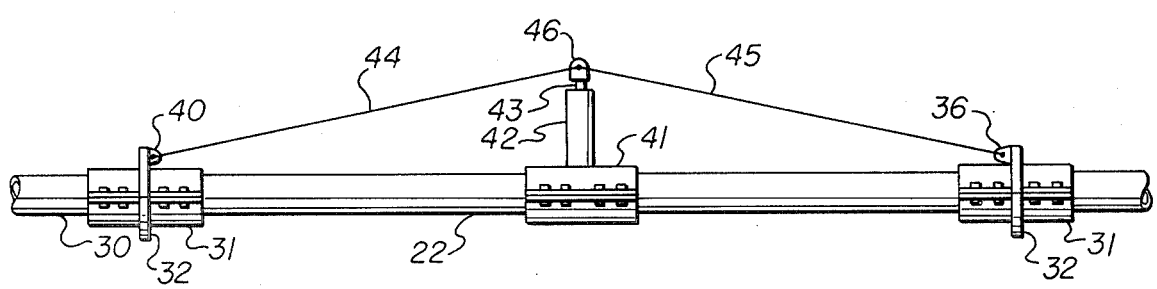
FIG. 11 is a view of still another apparatus for bowing the leading flowline.
Figure 12:
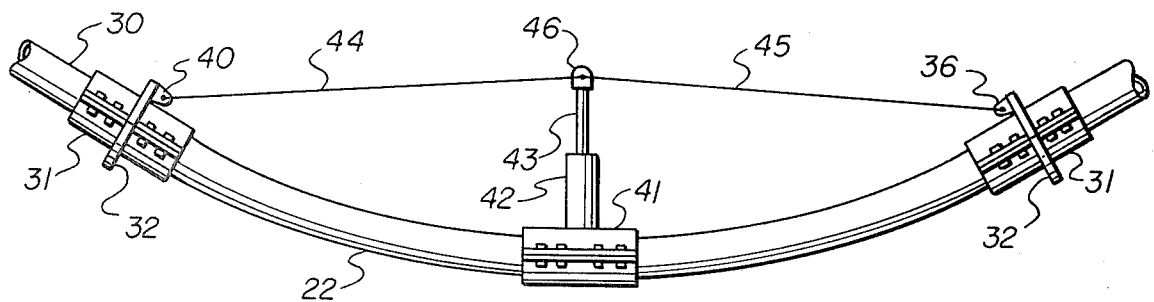
FIG. 12 is a view of the apparatus of FIG. 11 actuated to bow the flowline to the amount indicated in FIG. 6.

In FIG. 11, an alternative mechanism is illustrated for bowing flowline 22 for the purposes previously described. In this embodiment, flowline 22 is provided with sleeve members 31 having flanges 32 as in FIGS. 7 to 10. At the mid portion of flowline 22 there is provided a saddle member 41 which supports fluid actuated cylinder 42 thereon. Fluid actuated cylinder 42 has piston 43 which engages rod members 44 and 45 which are pivotally connected as at 46 and connected at their ends to flanges 32 as indicated at 36 and 40. Rod members 44 and 45 are shown as separate rigid members and are actuated by fluid (hydraulic and pneumatic) cylinder 42 and piston 43 to effect the bowing of flowline 22. A continuous cable could be substituted for members 44 and 45 and would function similarly to a bow string to effect the desired bowing of flowline 22. In FIG. 12, fluid actuated cylinder 42 and piston 43 are shown in a fully actuated position with flowline 22 fully bowed to the amount required for insertion into alignment funnel 19 as shown in FIG. 6. As indicated in the description of FIGS. 7 to 10, the bowing of flowline 22 by this embodiment may be carried out on the surface before the flowline is submerged on the flowline may be submerged and the bowing effected to a controlled amount prior to introduction of the end portion 30 into alignment funnel 19.

It should be noted, that in the broadest since, this invention involves the bowing of flowline 22 by any suitable means. Preferably, the bowing is accomplished by application of a longitudinal buckling force which is offset in the direction of desired lateral bowing. The force may be directly applied, as to a cable which is shortened by a turnbuckle or any other suitable mechanical device or by a fluid actuated piston as illustrated in FIGS. 7 to 10. The longitudinal buckling force may also be applied indirectly by applicaton of a lateral force to the midsection of the flowline as indicated in FIGS. 11 and 12. Any suitable mechanical mechanism may be used to apply the desired lateral force to the cable or rods connected to flowline 22 to cause the same to buckle.

Figure 13:
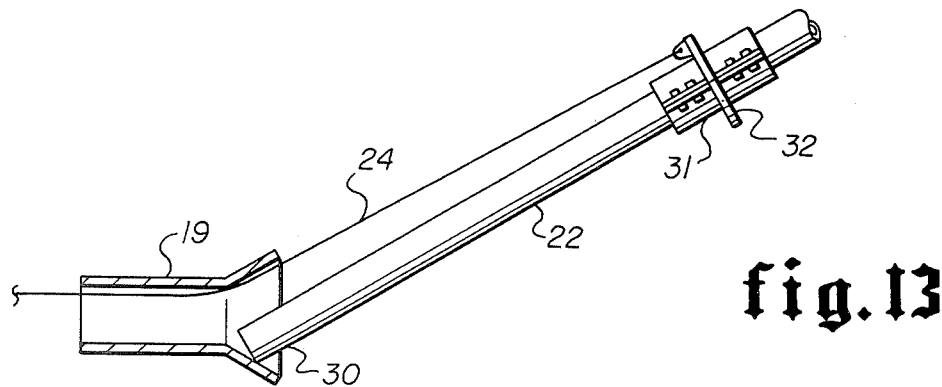
FIG. 13 is a view of another embodiment of the invention wherein the cable is connected to the leading flowline at the back of the portion which is to be bowed.
Figure 14:
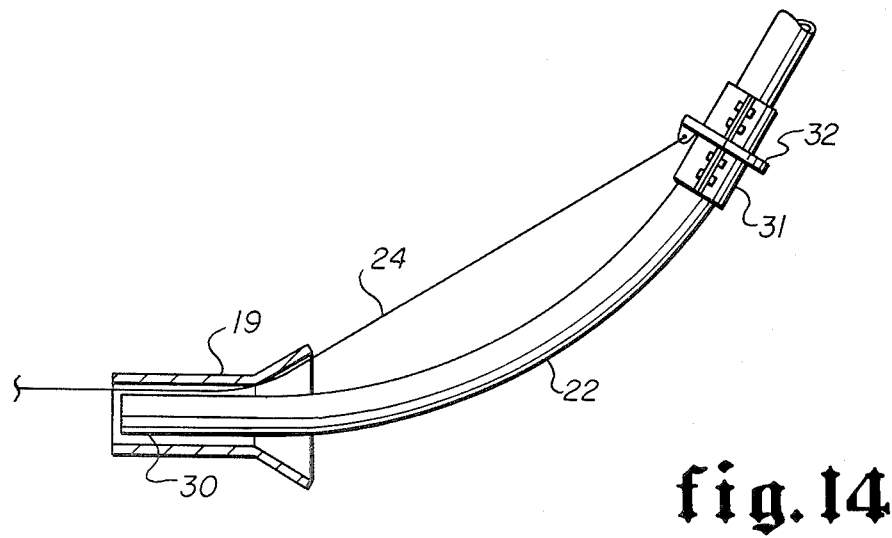
FIG. 14 is a view of the flowline shown in FIG. 13 pulled into the alignment funnel with the cable causing the flowline to bow to the desired amount.

In FIGS. 13 and 14, a still further method is shown for bowing the end portion of flowline 22. In this embodiment, the cable 24 which pulls flowline 22 into alignment funnel 19 is used to provide the longitudinal force to cause flowline 22 to buckle or bow to the desired amount. In FIG. 13, cable 24 is shown connected to flange 32 of sleeve member 31 positioned on flowline 22 at the rear end of the portion to be bowed. Flowline 22 is shown with end portion 30 abutting alignment funnel 19. As cable 24 pulls flowline 22 against alignment funnel 19, flowline 22 bows over a long shallow arc, as shown in FIG. 14, and the end portion 30 of flowline 22 is introduced straight into alignment funnel 19 with substantially no angular or lateral offset. In this embodiment, it would be necessary to leave cable 24 attached to flowline 22 to provide a continuing application of the longitudinal force required to cause flowline 22 to bow to the desired predetermined amount.

This invention consists broadly in the application of a lateral non-vertical bowing to the leading flowline to cause the same to bow in a long shallow arc in an amount sufficient to permit the end of the flowline, which is unbent, to be introduced straight into the alignment funnel. While several means have been shown for bowing the flowline to the desired predetermined amount, it should be understood that any equivalent means for bowing the flowline could be used. It should be understood therefore that while several embodiments of the invention have been shown, this invention may be practiced otherwise than as specifically described herein and is limited only by the appended claims.

I claim:

1. A method of connecting an underwater flowline in a body of water having a substantial current to an underwater connection point having an alignment funnel wherein the flowline is fed from a floating position and drawn by a cable into said alignment funnel, said method comprising bowing the leading flowline, prior to introduction into said alignment funnel, in a long shallow curvature in a lateral non-vertical direction by a predetermined amount such that the end of the leading flowline may enter said alignment funnel without any lateral or angular displacement relative to the longitudinal axis thereof.

2. A method according to claim 1 in which said leading flowline is bowed at a substantial distance from its end so that said end is substantially straight at the point of insertion into said alignment funnel.

3. A method according to claim 1 in which said flowline is bowed on the surface prior to submersion in the water.

4. A method according to claim 1 in which said leading flowline is bowed after submersion in the water.

5. A method according to claim 1 in which the amount of bowing of said leading flowline is adjusted in proportion to the amount of deflection of said flowline by the current.

6. A method according to claim 1 in which said flowline bowing is effected by application of a longitudinal buckling force offset in the direction of desired lateral bowing.

7. A method according to claim 1 in which said flowline bowing is effected by application of a lateral force to the midsection of said leading flowline.

8. A method according to claim 1 in which said cable is secured to said leading flowline at the rear of the portion to be bowed and said bowing is effected by pulling said leading flowline against said alignment funnel.

9. A method according to claim 1 in which said leading flowline is bowed on the surface prior to submersion in the water and at a substantial distance from its end so that said end is substantially straight at the point of insertion into said alignment funnel.

10. A method according to claim 1 in which said leading flowline is bowed after submersion in the water and at a substantial distance from its end so that said end is substantially straight at the point of insertion into said alignment funnel.

11. A system of apparatus for connection of an underwater flowline in a body of water having a substantial current to an underwater connection point comprising an alignment funnel positioned to direct said flowline toward said connection point, means attachable to said flowline to move the same into said alignment funnel, and means secured on the leading flowline operable to bow the same in a lateral non-vertical direction prior to introduction into said alignment funnel in a long shallow curvature in an amount sufficient to permit the end of said leading flowline to enter said alignment funnel without lateral or angular deflection relative to the longitudinal axis thereof.

12. A system of apparatus according to claim 11 in which said bowing means comprises laterally extending supports on said leading flowline at opposite ends of the section to be bowed, and means connected to said supports and operable to effect a longitudinal compression therebetween to cause said leading flowline to bow laterally.

13. A system of apparatus according to claim 12 in which said compression means is remotely operated.

14. A system of apparatus according to claim 12 in which said compression means is fluid actuated.

* * * * *